United States Patent
Lee et al.

(10) Patent No.: US 9,559,764 B1
(45) Date of Patent: Jan. 31, 2017

(54) METHOD FOR TRANSMITTING DATA IN MULTIPLE INPUT MULTIPLE OUTPUT WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Kilbom Lee, Seoul (KR); Hyunsu Cha, Seoul (KR); Dongku Kim, Seoul (KR); Minho Yang, Seoul (KR); Jiwon Kang, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/936,557

(22) Filed: Nov. 9, 2015

(30) Foreign Application Priority Data

Sep. 14, 2015 (KR) .......................... 10-2015-0129629

(51) Int. Cl.
  *H04B 7/04* (2006.01)

(52) U.S. Cl.
  CPC .................................. *H04B 7/0473* (2013.01)

(58) Field of Classification Search
  CPC ............... H04B 7/00; H04B 7/02; H04B 7/04; H04B 7/0413; H04B 7/0452; H04B 7/0456; H04B 7/0478; H04B 7/0482; H04B 7/0486; H04B 7/06; H04B 7/068; H04B 7/0602; H04B 7/0604; H04B 7/0606; H04B 7/0608; H04B 7/061

USPC .......................... 375/259, 260, 267, 295, 299
  See application file for complete search history.

(56) References Cited

U.S. PATENT DOCUMENTS

| | | | | |
|---|---|---|---|---|
| 8,422,585 B2* | 4/2013 | Tong | ................... | H04B 7/0619 375/295 |
| 2007/0281746 A1* | 12/2007 | Takano | ............... | H04B 7/0417 455/562.1 |
| 2011/0134849 A1* | 6/2011 | Lee | ...................... | H04B 7/0671 370/328 |
| 2013/0076566 A1* | 3/2013 | Jiang | ..................... | H01Q 1/246 342/373 |
| 2013/0230119 A1* | 9/2013 | Dhakal | ................ | H04B 7/0456 375/295 |
| 2016/0036502 A1* | 2/2016 | Han | ..................... | H04B 7/0413 375/267 |

* cited by examiner

*Primary Examiner* — Siu Lee
(74) *Attorney, Agent, or Firm* — Lee Hong Degerman Kang & Waimey

(57) ABSTRACT

A method for transmitting data in a multiple input multiple output (MIMO) wireless communication system is disclosed. The method for transmitting a signal to a receiver by a transmitter in a multiple input multiple output (MIMO) wireless communication system includes: generating a bit stream having the size of specific bits through channel coding of data; dividing the bit stream into a first bit stream having a first bit size and a second bit stream having a second bit size; allocating the second bit stream having the second bit size to an antenna sequence codeword on the basis of a signal transmission time; and transmitting the first bit stream having the first bit size to the receiver according to an order of antenna pairs indicated by the allocated antenna sequence codeword.

5 Claims, 7 Drawing Sheets

METHOD FOR TRANSMITTING DATA IN MULTIPLE INPUT MULTIPLE OUTPUT WIRELESS COMMUNICATION SYSTEM

CROSS-REFERENCE TO RELATED APPLICATIONS

Pursuant to 35 U.S.C. §119(a), this application claims the benefit of earlier filing date and right of priority to Korean Patent Application No. 10-2015-0129629, filed on Sep. 14, 2015, the contents of which are hereby incorporated by reference herein in its entire.

BACKGROUND OF THE INVENTION

Field of the Invention

The present invention relates to a wireless communication system, and more particularly to a method for transmitting data in a multiple input multiple output (MIMO) wireless communication system.

Discussion of the Related Art

The present invention relates to a method for transmitting and receiving radio frequency (RF) data, which can provide a more superior BER (Block Error Rate) performance as compared to the SM (Spatial Modulation) scheme for allocating a bit stream to a transmit (Tx) antenna index and the STBC-SM (Space Time Block Coded-Spatial Modulation) scheme in which the STBC scheme is combined with the SM scheme. Prior to describing the present invention, the SM scheme and the STBC-SM scheme will hereinafter be described in detail.

In addition, the present invention modifies a codeword matrix for use in GBD-QOSTBC (Generalized block diagonal quasi-orthogonal space time block code) so that it defines a sequence (composed of an antenna index) capable of being identified by a user equipment (UE) in different ways. GBD-QOSTBC will hereinafter be described in detail.

Assuming that the number of Tx antennas is denoted by $M_T$, the $(M_T \times M_T)$-sized GBD-QOSTBC codeword matrix is constructed. The Alamouti codeword corresponding to $M_T=2$ is defined as the matrix $A(s_i,s_j)$ as shown in the following Table 1. The symbols $s_i, s_j$ may be complex symbols (i.e., $s_i, s_j \in \Psi$) over signal constellation ($\Psi$).

$$A(s_i, s_j) = \begin{bmatrix} s_i & s_j \\ -s_j^* & s_i^* \end{bmatrix} \quad \text{[Equation 1]}$$

(where, $i \in \{1, 3, \ldots 2k-1\}$, $j \in \{2, 4, \ldots 2k\}, k = M_T/2$)

In the environment ($M_T=4$) based on Equation 1, the QO-STBC code is represented by the ABBA code as shown in the following equation 2.

$$\begin{bmatrix} A & B \\ B & A \end{bmatrix} = \begin{bmatrix} s_1 & s_2 & s_3 & s_4 \\ -s_2^* & s_1^* & -s_4^* & s_3^* \\ s_3 & s_4 & s_1 & s_2 \\ -s_4^* & s_3^* & -s_2^* & s_1^* \end{bmatrix} \quad \text{[Equation 2]}$$

In Equation 2, a diversity gain capable of being obtained using the ABBA code is still maintained at the value of 2. Therefore, a phase rotation of the $(s_3,s_4)$ symbol is needed to obtain the diversity gain of 4 corresponding to the number of Tx antennas. The phase-rotated QO-STBC codeword matrix may be defined as shown in the following equation 3.

$$C_4 = \begin{bmatrix} s_1 & s_2 & \tilde{s}_3 & \tilde{s}_4 \\ -s_2^* & s_1^* & -\tilde{s}_4^* & \tilde{s}_3^* \\ \tilde{s}_3 & \tilde{s}_4 & s_1 & s_2 \\ -\tilde{s}_4^* & \tilde{s}_3^* & -s_2^* & s_1^* \end{bmatrix} = \begin{bmatrix} A(s_1, s_2) & A(\tilde{s}_3, \tilde{s}_4) \\ A(\tilde{s}_3, \tilde{s}_4) & A(s_1, s_2) \end{bmatrix} \quad \text{[Equation 3]}$$

In Equations 2 and 3, $s_1, s_2, s_3, s_4 \in \Psi$ may be used, and $\tilde{s}_3, \tilde{s}_4 \in e^{j\theta_1}\Psi$ (where, $\tilde{s}_3 = s_3 \cdot e^{j\theta_1}, \tilde{s}_4 = s_4 \cdot e^{j\theta_1}$) may be used. Specifically, in order to modify the Q-OSTBC matrix shown in Equation 3 into a block diagonal matrix (GBD-QOSTBC), a symbol corresponding to an odd index and a symbol corresponding to an even index are defined in different ways in association with the symbols ($s_1, s_2 \in \Psi$, $\tilde{s}_3, \tilde{s}_4 \in e^{j\theta_1}\Psi$) located over the signal constellation. That is, the odd index symbol may be defined as $$s_{odd} = [s_1 \ s_3 \ \ldots \ s_{2k-1}]^T,$$

and the even index symbol may be defined as $$s_{even} = [s_2 \ s_4 \ \ldots \ s_{2k}]^T.$$

The following linear operation is applied to the above symbols, so that new symbols may be defined as shown in Equation 4.

$$[S_1 \ S_3 \ \ldots \ S_{2k-1}]^T = TDs_{odd} \quad \text{[Equation 4]}$$
$$[S_2 \ S_4 \ \ldots \ S_{2k}]^T = TDs_{even}$$

In order to discriminate the signal constellation of the newly defined symbols shown in Equation 4, $\Gamma$ may be defined. In other words, the symbol of Equation 4 may be defined as $S_j \in \Gamma$.

In Equation 4, 2k symbols may be classified into two sets (or two aggregates) according to the odd and even indexes. In this case, the (k×k) matrix T may be a random Hadamard matrix. A phase rotation matrix D for acquiring a maximum diversity gain may be represented by the following equation 5.

$$D = \begin{bmatrix} e^{j\theta_0} & & & \\ & e^{j\theta_1} & & \\ & & \ddots & \\ & & & e^{j\theta_{k-1}} \end{bmatrix} \quad \text{[Equation 5]}$$

Assuming that the Hadamard matrix $$T = \begin{bmatrix} 1 & 1 \\ 1 & -1 \end{bmatrix}$$

shown in Equation 4 is used, the equation 3 may be re-defined as a block diagonal matrix as shown in the following equation 6.

$$\check{C}_4 = \begin{bmatrix} A(s_1+\tilde{s}_3, s_2+\tilde{s}_4) & 0 \\ 0 & A(s_1-\tilde{s}_3, s_2-\tilde{s}_4) \end{bmatrix} = \quad \text{[Equation 6]}$$

$$\begin{bmatrix} S_1 & S_2 & & \\ -S_2^* & S_1^* & & 0 \\ & & S_3 & S_4 \\ & 0 & -S_4^* & S_3^* \end{bmatrix}$$

In Equations 4 and 6, the symbols $(s_1, s_2)$ may be symbols located over the original signal constellation $\Psi$ in which no phase rotation occurs, such that $\theta_0=0$ of the matrix D may be decided. In addition, although the conventional QO-STBC codeword matrix ($C_4$) shown in Equation 3 is different from the GBD-QOSTBC codeword matrix ($\check{C}_4$) shown in Equation 6, the conventional QO-STBC codeword matrix ($C_4$) and the GBD-QOSTBC codeword matrix ($\check{C}_4$) may have the same average BER performance.

In another example of GBD-QOSTBC, the codeword matrix ($C_8$) corresponding to $M_T=8$ may be used. In association with a total of 8 Tx symbols, two symbols are combined into one pair, and symbols of different pairs may belong to the signal constellation having rotated in different phases as shown in the following equation 7.

$$s_1, s_2 \in e^{j\theta_0}\Psi, \tilde{s}_3, \tilde{s}_4 \in e^{j\theta_1}\Psi, \bar{s}_5, \bar{s}_6 \in e^{j\theta_2}\Psi, \hat{s}_7, \hat{s}_8 \in e^{j\theta_3}\Psi \quad \text{[Equation 7]}$$

In Equation 7, $\theta_0=0$ may be decided. The phase may be determined according to the number of antennas and the modulation order of Tx symbols. Assuming that $M_T=8$ is decided and the BPSK symbol is transmitted, $$\theta_1 = \frac{\pi}{4}, \theta_2 = \frac{2\pi}{4}, \theta_3 = \frac{3\pi}{4}$$

may be used. The random Hadamard matrix (T) shown in FIG. 4 may be assumed as shown in the following equation 8.

$$T = \begin{bmatrix} 1 & -1 & 1 & -1 \\ 1 & 1 & -1 & -1 \\ -1 & 1 & 1 & -1 \\ 1 & 1 & 1 & 1 \end{bmatrix} \quad \text{[Equation 8]}$$

In addition, the codeword matrix ($C_8$) may be represented as shown in the following equation 9.

$$C_8 = \begin{bmatrix} A_1 & & & \\ & A_2 & & \\ & & A_3 & \\ & & & A_4 \end{bmatrix} = \quad \text{[Equation 9]}$$

$$\begin{bmatrix} S_1 & S_2 & & & & & & \\ -S_2^* & S_1^* & & & & & & \\ & & S_3 & S_4 & & & & \\ & & -S_4^* & S_3^* & & & & \\ & & & & S_5 & S_6 & & \\ & & & & -S_6^* & S_5^* & & \\ & & & & & & S_7 & S_8 \\ & & & & & & -S_8^* & S_7^* \end{bmatrix}$$

$A_1 = A(s_1 - \tilde{s}_3 + \bar{s}_5 - \hat{s}_7, s_2 - \tilde{s}_4 + \bar{s}_6 - \hat{s}_8) = A(S_1, S_2)$ $A_2 = A(s_1 + \tilde{s}_3 - \bar{s}_5 - \hat{s}_7, s_2 + \tilde{s}_4 - \bar{s}_6 - \hat{s}_8) = A(S_3, S_4)$ $A_3 = A(-s_1 + \tilde{s}_3 + \bar{s}_5 - \hat{s}_7, -s_2 + \tilde{s}_4 + \bar{s}_6 - \hat{s}_8) = A(S_5, S_6)$ $A_4 = A(s_1 + \tilde{s}_3 + \bar{s}_5 + \hat{s}_7, s_2 + \tilde{s}_4 + \bar{s}_6 + \hat{s}_8) = A(S_7, S_8)$ The matrix $A(s_i, s_j)$ is defined in Equation 1. Assuming that $M_T=2k=2^r$ is decided at a random condition denoted by $r \geq 2$, the GBD-QOSTBC matrix may be generalized as shown in the following 10.

$$C_{2k} = \begin{bmatrix} A(S_1, S_2) & & & \\ & A(S_3, S_4) & & \\ & & \ddots & \\ & & & A(S_{2k-1}, S_{2k}) \end{bmatrix} \quad \text{[Equation 10]}$$

In the codeword matrix shown in Equation 10, a horizontal axis may denote an antenna index, and a vertical index may denote a timeslot index. In the case of $M_T=6$ in which the number of Tx antennas is not denoted by $M_T=2k=2^r$, the GBD-QOSTBC codeword matrix may be constructed in association with $M_T=8$. Then, if the last two rows and the last two columns are deleted, the codeword for $M_T=6$ may be constructed.

The SM scheme will hereinafter be described in detail.

In accordance with the SM scheme, binary data is allocated to each Tx antenna index, an antenna corresponding to a bit stream to be transmitted is selected, and the data stream can be transmitted. That is, total amount of information to be transmitted may be the sum of the amount of information allocated to the data stream and the amount of information allocated to the antenna index.

FIG. 1 is a conceptual diagram illustrating the SM scheme. Referring to FIG. 1, it can be recognized that total amount of information to be transmitted is identical to the sum of the amount of information owned by the Tx symbol and the amount of information allocated to the antenna index used to transmit the Tx symbol information. In more detail, assuming that the number of Tx antennas is $M_T$, a maximum of $\log_2 M_T$ bits may be allocated to the Tx antenna index. Assuming that the PSK or QAM symbol having the modulation order of M is used, total amount (m) of information capable of being transmitted using the SM scheme may be defined as $m = \log_2(M_T) + \log_2(M)$. That is, the total amount (m) of information capable of being represented by bits per channel use may be defined as $m = \log_2(M_T) + \log_2(M)$.

For example, assuming that 3 bits are transmitted per channel use, when the number of Tx antennas is set to 2 and the modulation order is set to 4, the SM scheme may be used as shown in the following Table 1. In Table 1, $M_T=N_t$ is set, the number of antennas is an antenna index, and the Tx symbol is an M-PSK or M-QAM symbol.

TABLE 1

| Input bits | $N_t = 2, M = 4$ | | $N_t = 4, M = 2$ | |
|---|---|---|---|---|
| | Antenna number | Transmit symbol | Antenna number | Transmit symbol |
| 000 | 1 | $+1+j$ | 1 | $-1$ |
| 001 | 1 | $-1+j$ | 1 | $+1$ |
| 010 | 1 | $-1-j$ | 2 | $-1$ |

TABLE 1-continued

| | $N_t = 2, M = 4$ | | $N_t = 4, M = 2$ | |
| --- | --- | --- | --- | --- |
| Input bits | Antenna number | Transmit symbol | Antenna number | Transmit symbol |
| 011 | 1 | +1 − j | 2 | +1 |
| 100 | 2 | +1 + j | 3 | −1 |
| 101 | 2 | −1 + j | 3 | +1 |
| 110 | 2 | −1 − j | 4 | −1 |
| 111 | 2 | +1 − j | 4 | +1 |

The STBC-SM scheme will hereinafter be described in detail.

It is assumed that the (L×L) STBC codeword is based on L Tx antennas from among a total number ($M_T$) of Tx antennas. Whereas the SM scheme allocates the bit stream to each antenna index, L selected antennas must be continuously used during a timeslot of the STBC codeword length (L) when data is transmitted according to the STBC-SM scheme.

The amount of information (represented by the number of bits per channel use) capable of being loaded on the antenna index and then transmitted may be denoted by $$\frac{1}{L}\left\lfloor \log_2\binom{M_T}{L} \right\rfloor.$$

Therefore, the total amount (m) of information, which is loaded on the Tx symbol (M-PSK or M-QAM) and the antenna index and then transmitted, may be defined as $$m = \frac{1}{L}\left\lfloor \log_2\binom{M_T}{L} \right\rfloor + \log_2(M).$$

For convenience of description, it is assumed that $$M_T = 4, L = 2, \left\lfloor \log_2\binom{M_T}{L} \right\rfloor = \lfloor \log_2 6 \rfloor = 2, \text{ and } M = 2(BPSK)$$

may be used.

2 Tx antennas from among four Tx antennas are selected, and data is transmitted using the Alamouti method during 2 timeslots. 2 Tx antenna indexes are selected from among 4 Tx antenna indexes (1~4), and 2 bits are allocated as shown in the following Table 2. The STBC-SM codeword corresponding to the selected antenna is shown in the following equation 11. In Equation 11, a vertical axis may denote an antenna index, and a horizontal axis may denote a timeslot index.

TABLE 2

| Selected antenna indexes | Allocated bits |
| --- | --- |
| (1, 2) | 00 |
| (3, 4) | 01 |
| (2, 3) | 10 |
| (1, 4) | 11 |

[Equation 11]

$$\chi_1 = \{X_{11}, X_{12}\} = \left\{ \begin{pmatrix} x_1 & x_2 & 0 & 0 \\ -x_2^* & x_1^* & 0 & 0 \end{pmatrix}, \begin{pmatrix} 0 & 0 & x_1 & x_2 \\ 0 & 0 & -x_2^* & x_1^* \end{pmatrix} \right\}$$

$$\chi_2 = \{X_{21}, X_{22}\} = \left\{ \begin{pmatrix} 0 & x_1 & x_2 & 0 \\ 0 & -x_2^* & x_1^* & 0 \end{pmatrix}, \begin{pmatrix} x_2 & 0 & 0 & x_1 \\ x_1^* & 0 & 0 & -x_2^* \end{pmatrix} \right\} e^{j\theta}$$

In Equation 11, it can be recognized that all codeword elements of the codebook $\chi_2$ are phase-rotated by θ, such that the distance between symbols defined in two codebooks is maximized, resulting in improved BER performance. The value (θ) may be changed according to the number of Tx antennas and the modulation order, and it is impossible to search for the value (θ) using the closed Form, such that the value (θ) must be experimentally searched for. A detailed description thereof will hereinafter be described with reference to the attached drawings.

FIG. 2 is a conceptual diagram illustrating the STBC-SM scheme. For convenience of description, it is assumed that θ=π/2 is decided as shown in FIG. 2.

$x_1, x_2$ may denote BPSK symbols transmitted from respective antennas. Therefore, during two timeslots, one bit is additionally transmitted to each antenna so that a total of 2 bits may be transmitted to the respective antennas. In addition, 2 bits are additionally transmitted to the antenna index, such that a total of 4 bits can be transmitted. In this case, the 4-bit streams may be denoted by $u_1, u_2, u_3, u_4$ as shown in FIG. 2. Assuming that $u_1, u_2$ indicates a bit stream allocated to the antenna index and $u_3, u_4$ indicates a bit stream allocated to the BPSK symbol and then transmitted, a block diagram shown in FIG. 2 may be acquired.

In the meantime, under the condition that a channel is unchanged during only the timeslot ($L<M_T$), if it is assumed that L Tx antennas are selected from among $M_T$ Tx antennas and data is then transmitted at a fixed transfer rate, the STBC-DM scheme transmits some parts of the total amount of Tx data using the SM scheme. As a result, the amount of information, which is located on the Tx symbol and then transmitted, can be greatly reduced as compared to the method for transmitting data using the conventional (L×L)-sized STBC codeword, resulting in acquisition of a BER gain.

SUMMARY OF THE INVENTION

Accordingly, the present invention is directed to a method for transmitting data in a MIMO wireless communication system that substantially obviates one or more problems due to limitations and disadvantages of the related art.

An object of the present invention is to provide a method for transmitting data in a MIMO wireless communication system. Specifically, the present invention proposes a method for effectively transmitting and receiving RF data in an open-loop MIMO system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting a signal to a receiver by a transmitter in a multiple input multiple output (MIMO) wireless communication system includes: generating a bit stream having the size of specific bits through channel coding of data; dividing the bit stream into a first bit stream having a first bit size and a second bit stream having a second bit size; allocating the second bit stream having the second bit size to an antenna sequence codeword on the basis of a signal transmission time; and transmitting the first bit stream having the first bit size to the receiver according to an order of antenna pairs indicated by the allocated antenna sequence codeword.

The antenna sequence codeword may be defined by 2 timeslots and 2 antenna indexes.

The transmitting the first bit stream having the first bit size may include: transmitting the first bit stream having the first bit size using QO (quasi-orthogonal)-STBC (space time block code), according to the order of antenna pairs indicated by the allocated antenna sequence codeword, on a timeslot basis. The allocated antenna sequence codeword may indicate a pair of antennas needed to transmit data during 2 timeslots.

The sum of the first bit size and the second bit size may be identical to the specific bit size.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
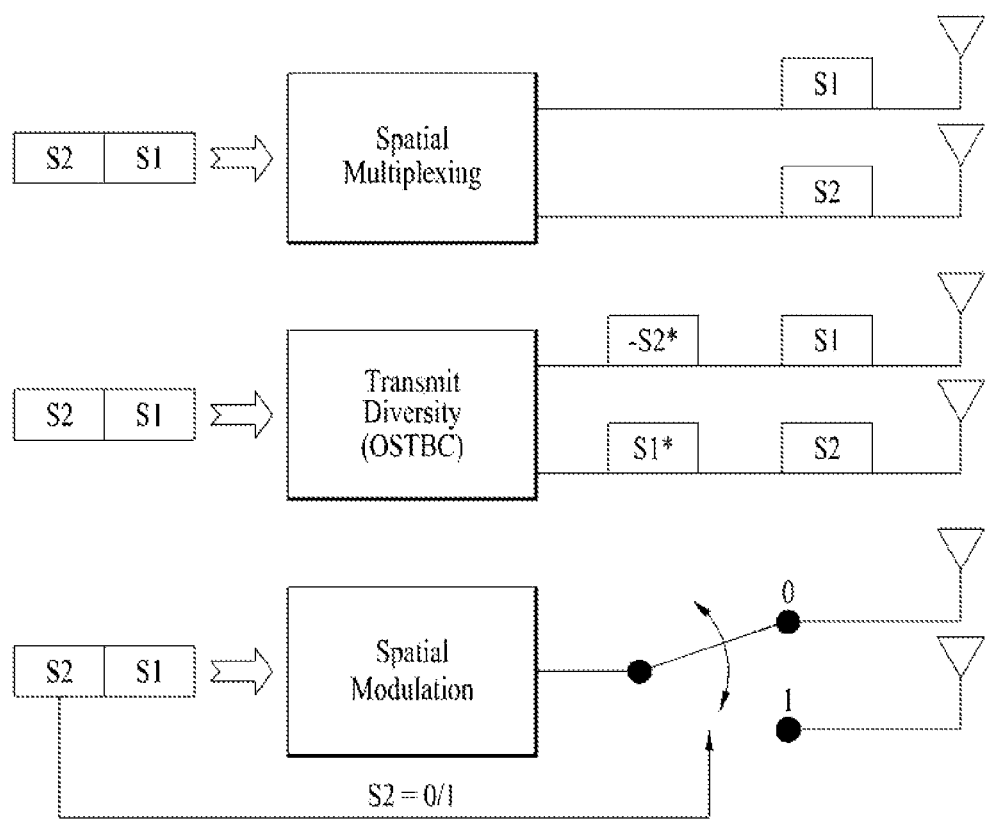
FIG. 1 is a conceptual diagram illustrating the SM scheme.
Figure 2:
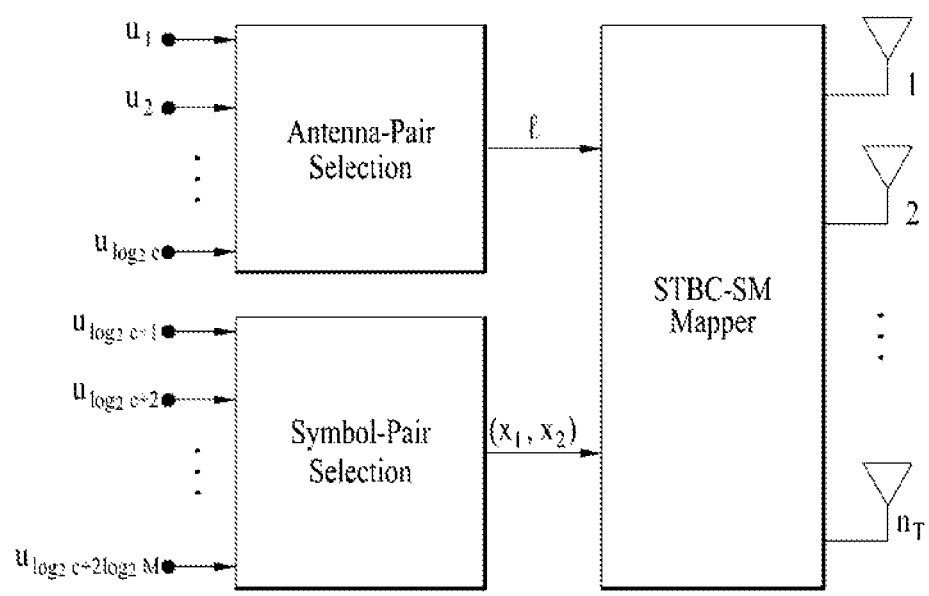
FIG. 2 is a conceptual diagram illustrating the STBC-SM scheme.

In order to increase the frequency efficiency per cell, a large amount of information must be allocated to each Tx symbol, such that there is a need to transmit the symbol having a high modulation level. However, when the high-modulation-level symbol is transmitted, the minimum distance between the above symbols over the signal constellation is gradually reduced, such that a BER performance may be deteriorated at the same SNR. The closed loop MIMO system in which a base station (BS) can utilize channel information between the transmitter and the receiver increases a valid reception (Rx) SNR using the MIMO beamforming scheme, such that it can directly increase the Achievable Rate (AR).

However, the Rx SNR gain (array gain) of the open loop MIMO system is determined by the number of Rx antennas, such that the Rx SNR gain (array gain) is decided by the number of Rx antennas. As a result, although many antennas of the BS are present, it may be difficult to directly increase the transfer rate in so far as Tx power is not amplified. When the open loop MIMO system transmits the same amount of data, the present invention does not improve the transfer rate due to the increased Rx SNR, but increases the BER performance when the same amount of data is transmitted in the open loop MIMO system, as compared to the legacy open loop MIMO data Tx/Rx methods.

The present invention is characterized in that the GBD-QOSTBC codeword matrix is modified into another within only the limitation condition in which a diversity gain is maintained, from the standpoint of the BER performance of the QO-STBC scheme. Such codeword modification may be identical to that of the method for changing an antenna to be used according to a data transmission time, and a sequence composed of the Tx antenna index is defined, such that the sequence may be used to transmit data. As a result, the total amount of data to be transmitted may be divided into the Tx symbol and the antenna index sequence and then transmitted. The above-mentioned data transmission scheme of the present invention will hereinafter be referred to as STBC-SSC (Space Time Block Coded Spatial Sequence Coding). The codebook according to the embodiment of the present invention will hereinafter be described.

A) Codebook Definition (1) $\chi_{QAM,QOSTBC}$: QO-STBC Symbol Vector Codebook (Comprised of M-PSK and M-QAM Symbols)

The QO-STBC symbol vector codebook is used to construct the ($M_T \times M_T$) codeword matrix based on the legacy QO-STBC scheme. In accordance with the proposed scheme, the QO-STBC symbol vector codebook may be used for GBD-QOSTBC symbol transformation (or conversion). The QO-STBC codeword may be acquired by extending the 2×2 Alamouti codeword (Orthogonal STBC) to the ($M_T \times M_T$) matrix based on the ABBA codeword in association with $M_T = 2^2, 2^3, \ldots, 2^r$. Accordingly, the QO-STBC codeword matrix may have half-orthogonal characteristics. That is, each row vector (or each column vector) constructing the QO-STBC codeword matrix may be perpendicular to $M_T/2$ different row vectors (column vectors). In order to easily the above-mentioned characteristics, $C_4^H C_4$ may be represented by the following equation 12 using the QO-STBC codeword shown in Equation 3.

$$C_4^H C_4 = \begin{bmatrix} c & 0 & d & 0 \\ 0 & c & 0 & d \\ d & 0 & c & 0 \\ 0 & d & 0 & c \end{bmatrix} \quad \text{[Equation 12]}$$

In Equation 12, $$c = |s_1|^2 + |s_2|^2 + |\tilde{s}_3|^2 + |\tilde{s}_4|^2$$

and $d = s_1 \tilde{s}_3 + \tilde{s}_3 s^*_1 - s_2 \tilde{s}^*_4 - \tilde{s}_4 s^*_2$ may be used. In addition, it can be recognized that the pair of symbols to be joint-ML decoded is composed of $(s_1,s_3),(s_2,s_4)$ as can be seen from Equation 12. If the scope of the present invention is extended for a random value $(M_T)$, each of two pairs composed of $M_T/2$ symbols needs to be joint-ML decoded.

In conclusion, the $\chi_{QAM,QOSTBC}$ codebook may be comprised of the codeword vector, the size of which is $M_T/2\times1$. Elements of the vector may be symbols, for example, M-PSK, M-QAM, etc. The elements of the vector are composed of a total of $M^{M_T/2}$ vectors, as represented by the following equation 13.

$$\chi_{QAM,QOSTBC} = \left\{ \begin{bmatrix} s_1[1] \\ \vdots \\ s_{M_T/2}[1] \end{bmatrix}, \begin{bmatrix} s_1[2] \\ \vdots \\ s_{M_T/2}[2] \end{bmatrix}, \ldots, \begin{bmatrix} s_1[M^{M_T/2}] \\ \vdots \\ s_{M_T/2}[M^{M_T/2}] \end{bmatrix} \right\}$$
$$= \{s[1], s[2], \ldots, s[M^{M_T/2}]\}$$

[Equation 13]

In Equation 13, $$s_n[k] \in \Psi$$

may be used, where $k\in\{1,2,\ldots M^{M_T/2}\}, n\in\{1,2,\ldots,M_T/2\}$.

(2) $\chi_{G-STBC}$: GBD-QOSTBC Symbol Vector Codebook

By means of the above equation 4, the codeword vectors of $\chi_{QAM,QOSTBC}$ defined as the QAM or PSK symbol may be converted into the GBD-QOSTBC symbols as shown in the following equation 14.

$$\chi_{G-STBC} = \{TDs[1], TDs[2], \ldots, TDs[M^{M_T/2}]\},$$
$$\text{where } s[k] \in \chi_{QAM,QOSTBC}$$
$$= \{S[1], S[2], \ldots, S[M^{M_T/2}]\}$$
$$= \left\{ \begin{bmatrix} S_1[1] \\ \vdots \\ S_{M_T/2}[1] \end{bmatrix}, \begin{bmatrix} S_1[2] \\ \vdots \\ S_{M_T/2}[2] \end{bmatrix}, \ldots, \begin{bmatrix} S_1[M^{M_T/2}] \\ \vdots \\ S_{M_T/2}[M^{M_T/2}] \end{bmatrix} \right\}$$

[Equation 14]

Equation 14 may be understood as one-to-one mapping (1:1 mapping) between the codeword vectors as shown in the following equation 15.

$$s[1] \rightarrow S[1]$$
$$s[2] \rightarrow S[2]$$
$$\vdots$$
$$s[M^{M_T/2}] \rightarrow S[M^{M_T/2}]$$

[Equation 15]

Referring to Equations 14 and 15, since mapping is achieved on a vector basis, the codeword vector of $\chi_{G-STBC}$ located nearest to the Rx signal vector is decided, and the symbol vector composed of the QAM symbol of $\chi_{QAM,QOSTBC}$ is detected through the inverse operation. Symbols used in Equation 14 are summarized as follows.

S[k]: $M_T/2\times1$-sized codeword vector
$S_j[k]$: elements of the vector S[k], $j\in\{1,2,\ldots M_T/2\}$
$S_j[k]\in\Gamma$ (3) $\chi_{Ant}$: Antenna Index Sequence Codebook 2 consecutive timeslots may be denoted by one unit as represented by $t=(1,2), (3,4), \ldots, (M_T-1,M_T)$ and an antenna index to be used in response to the transmission (Tx) time may be defined. That is, two antenna indexes to be used in 2 consecutive timeslots may be defined. Two antennas may be combined into one pair so that the two antennas may serve as one symbol constructing the antenna index sequence. Therefore, $M_T/2$ antenna pairs may construct one sequence, and the set of different antenna index sequences is denoted by $\chi_{Ant}$. The antenna sequence codebook $\chi_{Ant}$ may be represented by the following equation 16.

$$\chi_{Ant} = \{I_j, u_j, \text{where } j \in \{1, 2, \ldots m2^{B_{SSC}}\}\}$$

[Equation 16]

In Equation 16, $B_{SSC}$ is the amount of information allocated to the antenna index sequence and then transmitted, and is represented on a bit basis. In addition, $I_j$ is the j-th antenna index sequence, and $u_j$ is a bit sequence corresponding to $I_j$. In more detail, $I_j$ and $u_j$ may be represented by the following equation 17.

$$I_j = (l_1, l_2), (l_3, l_4), \ldots, (l_{M_T-1}, l_{M_T}),$$

[Equation 17]

$$u_j = [u_1, u_2, u_3, \ldots, u_{B_{SSC}}]$$

$$l_i \neq l_j, \forall i,$$

$$\forall j \in \{1, 2, \ldots, 2^{B_{SSC}}\},$$

$$u_b \in \{0, 1\},$$

$$b \in \{1, \ldots, B_{SSC}\}$$

$$u_i \neq u_j,$$

$$\forall i, \forall j \in \{1, 2, \ldots, 2^{B_{SSC}}\}.$$

(4) $\chi_H$: The Set of Effective Channel Matrices $\chi_H$ is the set of $(M_T\times M_T)$-sized effective channel matrices corresponding to the antenna index sequence defined in the codebook $\chi_{Ant}$. This information is owned by only the open loop MIMO system, and may be represented by the following equation 18.

$$\chi_H\{\tilde{H}_1, \tilde{H}_2, \ldots, \tilde{H}_{2^{B_{SSC}}}\},$$

[Equation 18]

$$\tilde{H}_j \in \square^{\tilde{M}_T \times \tilde{M}_T}, j \in \{1, 2, \ldots, 2^{\tilde{B}_{SSC}}\}$$

In Equation 18, $B_{SSC}$ is the amount of information allocated to the antenna index sequence in the same manner as described above. The matrix $\tilde{H}_3$ may be decided by $I_j$ of $\chi_{Ant}$. Assuming that data is transmitted using the j-th antenna sequence and the pair of Tx antennas used in 2 timeslots $(t_0, t_0+1)$ is denoted by $(m_1,m_2)$, four elements of the effective channel $\tilde{H}_3$ corresponding to $(m_1,m_2)$ may be represented by the following expression.

[Expression]

$$\tilde{H}_j(m_1,t_0)=h(m_1)$$

$$\tilde{H}_j(m_1,t_0+1)=h(m_2)$$

$\overset{\Box}{H}_j(m_2,t_0) = -h(m_1)^*$ $\overset{\Box}{H}_j(m_2,t_0+1) = h(m_2)^*$ In the above expression, $$h = [h_1 \quad h_2 \quad \ldots \quad h_{M_T}]$$

may be used, and $h(m_2)$ is the $m_2$-th element of the vector (h), where a subscript '*' may denote a conjugate complex number. It is assumed that respective elements may be independently from each other, and may have the same independent and identically distributed Gaussian elements, and different vector channels may be independent of each other.

For example, if it is assumed that the antenna indexes sequentially used in the time slots (1,2), (3,4), (5,6), (7,8) are (1,3), (2,4), (5,7), (6,8), the matrix $\overset{\Box}{H}_3$ may be represented by the following equation 19.

$$H_j = \begin{bmatrix} h_1 & h_3 & 0 & 0 & 0 & & & \\ 0 & 0 & h_2 & h_4 & \vdots & & & \\ -h_3^* & h_1^* & 0 & 0 & \vdots & \vdots & & \\ 0 & 0 & -h_4^* & h_2^* & 0 & 0 & & \\ \vdots & \vdots & 0 & 0 & h_5 & h_7^* & & \\ & & & & 0 & 0 & h_6 & h_8 \\ & & & & -h_7^* & h_5^* & 0 & 0 \\ & & & & 0 & 0 & -h_8^* & h_6^* \end{bmatrix}$$ [Equation 19]

B) Antenna Index Sequence Generation

In accordance with the present invention, a maximum space time diversity gain provided from the GBD-QOSTBC scheme is maintained, and at the same time the GBD-QOSTBC codeword matrix formed in a block diagonal matrix shape may be modified. A detailed description thereof will hereinafter be described with reference to the attached drawings.

Figure 3:
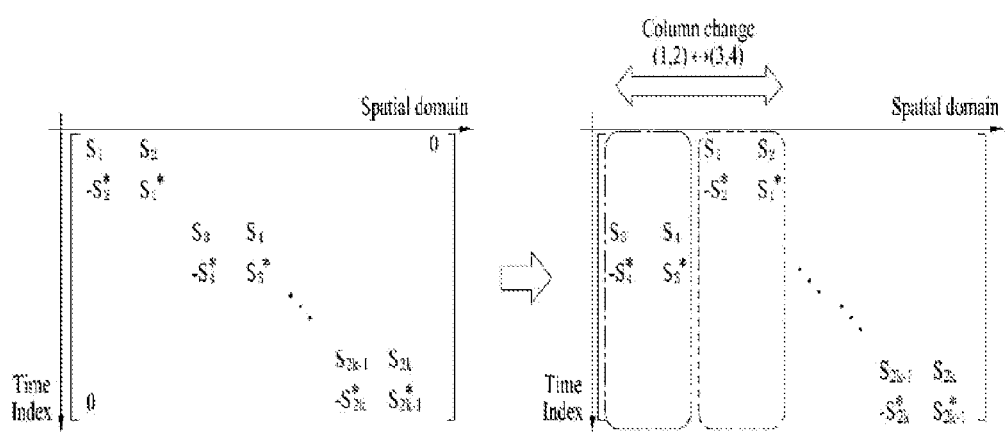
FIG. 3 is a conceptual diagram illustrating a method for generating an antenna index sequence according to an embodiment of the present invention.

FIG. 3 is a conceptual diagram illustrating a method for generating an antenna index sequence according to an embodiment of the present invention.

Referring to FIG. 3, two antennas used in two consecutive timeslots may be used as one symbol constructing the sequence, and the GBD-QOSTBC codeword matrix may be modified in units of a column vector as shown in FIG. 3. In FIG. 3, the left GBD-QOSTBC codeword matrix may be denoted by $C_{2k}$, and the right modified GBD-QOSTBC codeword matrix may be denoted by $\overset{\Box}{C}_{2k}$.

In this case, although $\overset{\Box}{C}_{2k}$ is not configured in a block diagonal matrix shape, $\overset{\Box}{C}_{2k}^H \overset{\Box}{C}_{2k}$ matrix may still be a diagonal matrix. In addition, $C_{2k}^H C_{2k}$ and $\overset{\Box}{C}_{2k}^H \overset{\Box}{C}_{2k}$ do not correspond to the same diagonal matrix, and the same principles may also be applied to the effective channel matrix corresponding to $\overset{\Box}{C}_{2k}^H \overset{\Box}{C}_{2k}$. Therefore, user equipments (UEs) may be identified by different kinds of information.

A maximum number of sequences capable of being generated by modification of the $M_T \times M_T$ GBD-QOSTBC matrix may be the number of cases achieved when every 2 Tx antennas from among a total of $M_T$ Tx antennas are selected a total of $M_T/2$ times without duplication, and may be represented by the following equation 20.

$$N_{Max} = {}_{M_T}C_2 \times {}_{M_T-2}C_2 \times \ldots \times {}_4C_2$$ [Equation 20]

In this way, a maximum amount of information capable of being allocated to the antenna sequence index may be represented by the following equation 21.

$$B_{SSC} = \frac{1}{M_T}\log_2\left(\frac{M_T!}{2^{M_T/2}}\right) \text{ (bits/channel use)}$$ [Equation 21]

$$= \frac{1}{M_T}\log_2(M_T!) - \frac{1}{2}$$

$$\approx \log_2(M_T) + \underbrace{\frac{1}{M_T \ln 2} + \frac{1}{2M_T}\log_2(M_T) -}_{(\alpha)}$$

$$\underbrace{\left(\frac{1}{\ln 2} + \frac{1}{2}\right)}_{(\beta)} \geq \log_2(M_T) - 2$$

Figure 4:
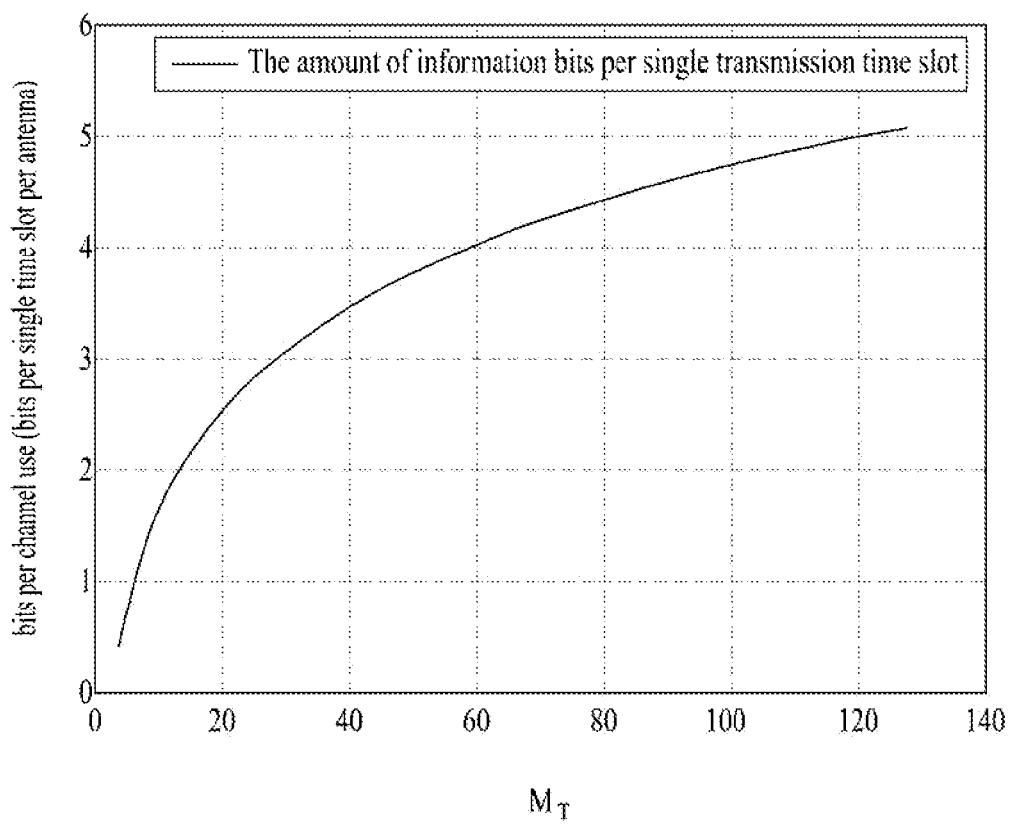
FIG. 4 illustrates the relationship between the number of antennas and the maximum amount of information when the antenna index sequence is used according to an embodiment of the present invention.

In Equation 12, if $M_T$ is at a very high value, $(\alpha) \to 0$ may be decided, $(\beta)$ is a constant (or an invariable number) that always be less than 2. Therefore, when many Tx antennas are present, $B_{SSC}$ may be represented by Equation 21. In addition, as the number of antennas increases as shown in the graph of FIG. 4, a maximum amount of information may increase in proportion to the logarithmic function as shown in Equation 21.

C) Transmission/Reception (Tx/Rx) Procedures of the STBC-SSC Based Signal

First of all, it is assumed that the transmitter and the receiver may have the codebooks (1) to (3), and the receiver further includes the codebook (4) through channel estimation.

Figure 5:
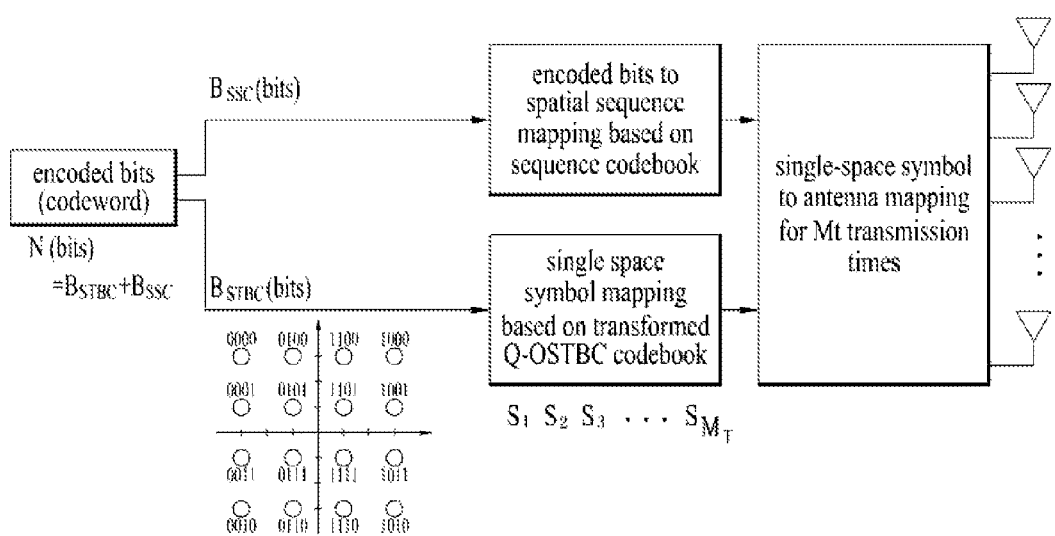
FIG. 5 is a block diagram illustrating a transmitter according to an embodiment of the present invention.

FIG. 5 is a block diagram illustrating a transmitter according to an embodiment of the present invention.

Referring to FIG. 5, data to be transmitted may be channel-encoded, such that the encoded bit stream (i.e., the codeword) may occur. For convenience of description, it is assumed that one codeword is used and a total number of bits is denoted by $N = B_{QOSTBC} + B_{SSC}$. In this case, $B_{QOSTBC}$ bits from among a total of N bits may be transmitted using the QO-STBC scheme, and $B_{SSC}$ bits may be allocated to the antenna sequence and then transmitted. A reference for dividing the encoded bit stream corresponding to the length of N into two portions must be recognized by both the transmitter and the receiver in order to implement the encoding and decoding processes.

$2^{B_{SSC}}$ bit streams, each of which has the length of $B_{SSC}$, may be allocated to a total of $2^{B_{SSC}}$ antenna sequences. Information regarding the bit stream allocated to each antenna sequence has already been defined in the codebook $\chi_{Ant}$. In addition, as can be seen from the following equation 22, specific information indicating which one of antenna index sequences will be used by the bit stream to be transmitted may be decided according to a data transmission (Tx) time.

$$u_j = [u_1, u_2, u_3, \ldots, u_{B_{SSC}}] \to l_j$$ [Equation 22]

If the antenna index sequence codeword is decided, the order of antenna pairs to be used in the timeslot pair $(t_1,t_2)=(1, 2), \ldots, (M_T-1, M_T)$ may be used. The GBD- QOSTBC symbols $S_1, S_2, \ldots, S_{M_T}$ may be transmitted according to the decided order.

Figure 6:
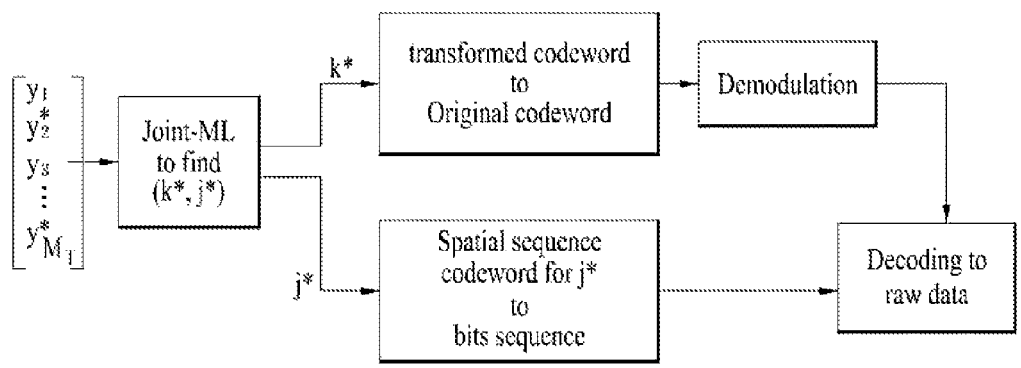
FIG. 6 is a block diagram illustrating a receiver according to an embodiment of the present invention.

The operations of the receiver configured to reconstruct the transmitted data will hereinafter be described. FIG. 6 is a block diagram illustrating a receiver according to an embodiment of the present invention. In FIG. 6, $$y = [y_1 \ y_2^* \ y_3 \ \ldots \ y_{M_T}^*]^T$$

may denote the Rx signal vector received during the $M_T$ timeslot.

Referring to FIG. 6, the receiver may search for the codeword indexes of the codebooks ($\chi_{QAM,QOSTBC}, \chi_{G-STBC}, \chi_H, \chi_{Ant}$) through decoding. The overall decoding order is as follows. The concept of FIG. 6 is based on the Joint ML (maximum likelihood) scheme capable of simultaneously searching for the antenna sequence ($\chi_{Ant}$) and the symbol ($\chi_{G-STBC}$). A method for searching for the $\chi_{Ant}$ symbol will first be described, and a method for searching for the $\chi_{G-STBC}$ symbol will be described later.

(a) Joint-ML decoding

The receiver may perform Joint-ML decoding using the effective channel codebook ($\chi_H$) in which the GBD-QOSTBC codebook ($\chi_{G-STBC}$) and the antenna index sequence are reflected. From among the effective channel matrices defined in the codebook $\chi_H = \{\hat{H}_1, \hat{H}_2, \ldots, \hat{H}_{2^{B_{SSC}}}\}$, if a conjugate transpose matrix of the j-th matrix is multiplied by the Rx signal vector, the multiplication result is represented by the following equation 23.

$$\tilde{y}_j = H_j^H \begin{bmatrix} y_1 \\ y_2^* \\ y_3 \\ \vdots \\ y_8^* \end{bmatrix}, \text{ where } j \in \{1, 2, \ldots, 2^{B_{SSC}}\} \quad \text{[Equation 23]}$$

First elements corresponding to the odd indexes and second elements corresponding to the even indexes of the vector ($\tilde{y}_j$) of Equation 23 are distinguished from one another so that the first and second elements are divided into two vectors ($\tilde{y}_j^{Even}, \tilde{y}_j^{Odd}$). $\tilde{y}_j^{Even}, \tilde{y}_j^{Odd}$ may be defined as shown in the following equation 24.

$$\tilde{y}_j^{Even} = \begin{bmatrix} \tilde{y}_{j,2} \\ \tilde{y}_{j,4} \\ \vdots \\ \tilde{y}_{j,M_T} \end{bmatrix}, \tilde{y}_j^{Odd} = \begin{bmatrix} \tilde{y}_{j,1} \\ \tilde{y}_{j,3} \\ \vdots \\ \tilde{y}_{j,M_T-1} \end{bmatrix} \quad \text{[Equation 24]}$$

Assuming that data is transmitted according to the j-th antenna index sequence, the GBD-QOSTBC codeword located nearest to the Rx signal vector is searched for in $\chi_{G-STBC}$. In this case, although it is assumed that the distance measurement method for searching for the nearest codeword vector is $l_2$-norm, it may be possible to use other measurement methods as necessary. In association with two symbol vectors ($\tilde{y}_j^{Even}, \tilde{y}_j^{Odd}$), the k-th codeword vector of the codebook $\chi_{G-STBC}$ can be represented by the following equation 25, and the $l_2$-norm value may be represented by the following equation 26.

$$d_{Even}^{[k,j]} = \min_{\forall k} \left\| \tilde{y}_j^{Even} - \begin{bmatrix} a_j & & & \\ & b_j & & \\ & & c_j & \\ & & & d_j \end{bmatrix} S[k] \right\|_2 \quad \text{[Equation 25]}$$

$$d_{Odd}^{[k,j]} = \min_{\forall k} \left\| \tilde{y}_j^{Odd} - \begin{bmatrix} a_j & & & \\ & b_j & & \\ & & c_j & \\ & & & d_j \end{bmatrix} S[k] \right\|_2 \quad \text{[Equation 26]}$$

In Equations 25 and 26, $S[k] \in \chi_{G-STBC}$ may be used, and $a_j, b_j, c_j, d_j$ may be derived from the following equation 27.

$$H_j^H H_j = \begin{bmatrix} a_j I_2 & & & \\ & b_j I_2 & & \\ & & c_j I_2 & \\ & & & d_j I_2 \end{bmatrix}, \text{ where } I_2 = \begin{bmatrix} 1 & 0 \\ 0 & 1 \end{bmatrix} \quad \text{[Equation 27]}$$

In addition, in association with the j-th codeword matrix of $\chi_H$, Equation 25 and Equation 26 can be calculated in consideration of all codeword vectors ($s[k], \forall k \in \{1, 2, \ldots, M^{M_T/2}\}$) of $\chi_{G-STBC}$. In association with all codeword matrices of $\chi_H$, the above-mentioned processes are repeatedly performed as denoted by ($\hat{H}_j, \forall j \in \{1, 2, \ldots, 2^{B_{SSC}}\}$), $d_{Odd}^{[k,j]}$ and $d_{Even}^{[k,j]}$ values may be searched for in all values (k, j). Thereafter, the antenna sequence index and the GBD-QOSTBC codeword index may be decided by the following equation 28 according to the following reference based on the calculated value.

$$(k^*, j^*) = \min_{\forall k, \forall j} \left( d_{Even}^{[k,j]} + d_{Odd}^{[k,j]} \right) \quad \text{[Equation 28]}$$

In Equation 28, k* is a codeword vector index of the codebook $\chi_{G-STBC}$, and j* is a codeword matrix index of the codebook $\chi_{Ant}$.

(b) As can be seen from Equation 29, the symbol vector $\chi_{QAM,QOSTBC}$ may be searched for through the inverse operation of Equation 14.

$$\hat{s} = s[k^*], \text{ where } s[k^*] \in \chi_{QAM,QOSTBC} \quad \text{[Equation 29]}$$

(c) Not only through the decision of the Tx symbol such as QAM/PSK or the like, but also through the demodulation of the decided symbol, binary data can be extracted.

(d) The bit stream allocated to the decided j*-th antenna sequence may be extracted from the codebook $\chi_{Ant}$.

(e) The encoded bit stream formed by adding the binary data extracted from the above methods (c) and (d) to one bit stream may be constructed, and the resultant encoded bit stream is decoded so that an original signal (binary data) is reconstructed.

An example of the STBC-SSC signal transmission method will hereinafter be given on the basis of the above-mentioned description. First of all, 8 bits may be transmitted according to the QO-STBC scheme (i.e., 8 bits may be respectively transmitted through 8 antennas). It is assumed that 2-bit data is transmitted using SSC, such that the following definition may be achieved.

8×8 GBD-QOSTBC, $M_T$=8
$B_{STBC}$=8 bits and $B_{SSC}$=2 bits
Constellation: BPSK (M=2)
In addition, the internal parameters (T,D) according to the system environment may be defined as follows.

$D=\text{diag}\{e^{j\theta_0}, e^{j\theta_1}, e^{j\theta_2}, e^{j\theta_3}\}$,

If 8 antennas are used and BPSK is then used, phases needed for acquiring a maximum space time diversity of GBD-QOSTBC are denoted by $$\theta_0 = 0,$$

$$\theta_1 = \frac{\pi}{4}$$

$$\theta_2 = \frac{\pi}{2},$$

$$\theta_3 = \frac{3\pi}{4}.$$

It is assumed that Hadamard matrix is denoted by $$T = \begin{bmatrix} 1 & -1 & 1 & -1 \\ 1 & 1 & -1 & -1 \\ -1 & 1 & 1 & -1 \\ 1 & 1 & 1 & 1 \end{bmatrix}.$$

In order to transmit a total of 8 bits for each Tx data stream, one BPSK symbol for each antenna may be transmitted during the time slot ($M_T$=8). Each element of the codebooks ($\chi_{QAM,QOSTBC}$, $\chi_{G-STBC}$) nay be denoted by a (4×1) vector. Each element of one vector may be set to one of 2 BPSK signals. Therefore, each codebook ($\chi_{QAM,QOSTBC}$, $\chi_{G-STBC}$) may have a total number ($M^{M_T/2}=2^4=16$) of the (4×1) codeword vectors, such that the total of ($M^{M_T/2}=2^4=16$) (4×1) codeword vectors may serve as the element. $\chi_{QAM,QOSTBC}$ and $\chi_{G-STBC}$ may be represented as follows.

$\chi_{QAM,QOSTBC}=\{s[1], s[2], \ldots, s[16]\}$, $s_n[k] \in \{-1,+1\}$

Parameter range: $k \in \{1,2,\ldots,16\}$, $n \in \{1,2,\ldots 4\}$ $\chi_{G-STBC}=TD \times \chi_{QAM,QOSTBC}=\{S[1], S[2], \ldots, S[16]\}$ The amount of information applied to the Tx antenna index sequence is a total of 2 bits, and the Tx antenna index sequence and the binary signal thereto may be defined as follows.

$\chi_{Ant}=\{I_1, I_2, I_3, I_4, u_1, u_2, u_3, u_4\}$ $I_1=(1,2), (3,4), (5,6), (7,8), I_2=(1,3), (2,4), (5,7), (6,8)$ $I_3=(1,4), (2,5), (3,8), (6,7), I_4=(1,5), (2,6), (3,7), (4,8)$ $u_1=[0,0], u_2=[0,1], u_3=[1,0], u_4=[1,1]$ The effective channel matrix codebook $\chi_H=\{\bar{H}_1, \bar{H}_2, \bar{H}_3, \bar{H}_4\}$ corresponding to $\chi_{Ant}=\{I_1, I_2, I_3, I_4, u_1, u_2, u_3, u_4\}$ is as follows.

$$\bar{H}_1 = \begin{bmatrix} h_1 & h_2 & & & & & & \\ -h_2^* & h_1^* & & & & & & \\ & & h_3 & h_4 & & & & \\ & & -h_4^* & h_3^* & & & & \\ & & & & h_5 & h_6 & & \\ & & & & -h_6^* & h_5^* & & \\ & & & & & & h_7 & h_8 \\ & & & & & & -h_8^* & h_7^* \end{bmatrix},$$

$$\bar{H}_2 = \begin{bmatrix} h_1 & h_3 & 0 & 0 & 0 & & & 0 \\ 0 & 0 & h_2 & h_4 & \vdots & & & \\ -h_3^* & h_1^* & 0 & 0 & \vdots & \vdots & & \\ 0 & 0 & -h_4^* & h_2^* & 0 & 0 & \ldots & 0 \\ \vdots & \vdots & 0 & 0 & h_5 & h_7^* & 0 & 0 \\ & & & & 0 & 0 & h_6 & h_8 \\ & & & & -h_7^* & h_5^* & 0 & 0 \\ 0 & 0 & \ldots & 0 & 0 & 0 & -h_8^* & h_6^* \end{bmatrix},$$

$$\bar{H}_3 = \begin{bmatrix} h_1 & h_4 & & & & & & \\ & & h_2 & h_5 & & & & \\ & & & & h_3 & h_8 & & \\ -h_4^* & h_1^* & & & & & & \\ & & -h_5^* & h_2^* & & & & \\ & & & & & & h_6 & h_7 \\ & & & & & & -h_7^* & h_6^* \\ & & & & -h_8^* & h_3^* & & \end{bmatrix},$$

$$\bar{H}_4 = \begin{bmatrix} h_1 & h_5 & & & & & & \\ & & h_2 & h_6 & & & & \\ & & & & h_3 & h_7 & & \\ & & & & & & h_4 & h_8 \\ -h_5^* & h_1^* & & & & & & \\ & & -h_6^* & h_2^* & & & & \\ & & & & -h_7^* & h_3^* & & \\ & & & & & & -h_8^* & h_4^* \end{bmatrix}$$

Assuming that the k-the symbol vector $S[k] \in \chi_{G-STBC}$ is transmitted using the sequence ($I_2$) and the reception noise is omitted, Equation 23 may also be represented by the following equation 30.

$$\tilde{y}_j = \bar{H}_j^H \bar{H}_2 \times S[k], \qquad \text{[Equation 30]}$$

where $j \in \{1,2,3,4\}$, $k \in \{1,2,\ldots,16\}$

Specifically, $\bar{H}_2^H \bar{H}_2$ for use in $\tilde{y}_2 = \bar{H}_2^H \bar{H}_2 \times S[k]$ may have the following equation 31.

[Equation 31]

$$\bar{H}_2^H \bar{H}_2 = \begin{bmatrix} (h_1 h_1^* + h_3 h_3^*) I_2 & & & \\ & (h_2 h_2^* + h_4 h_4^*) I_2 & & \\ & & (h_5 h_5^* + h_7 h_7^*) I_2 & \\ & & & (h_6 h_6^* + h_8 h_8^*) I_2 \end{bmatrix}$$

In Equations 25 and 26, the parameters $(a_2,b_2,c_2,d_2)$ corresponding to $(j=2)$ may be $a_2=h_1h^*_1+h_3h^*_3$, $b_2=h_2h^*_2+h_4h^*_4$, $c_2=h_5h^*_5+h_7h^*_7$, $d_2=h_6h^*_6+h_8h^*_8$, respectively. Even when $\mathring{\mathbf{H}}_j^H \mathring{\mathbf{H}}_j$ (where j=1,3,4) is used, the above parameters may be derived in the same manner as described above.

The matrices ($\mathring{\mathbf{H}}_1^H \mathring{\mathbf{H}}_2$, $\mathring{\mathbf{H}}_3^H \mathring{\mathbf{H}}_2$, $\mathring{\mathbf{H}}_4^H \mathring{\mathbf{H}}_2$) corresponding to the product of the effective channel ($\mathring{\mathbf{H}}_2$) of the sequence ($I_2$) and a transpose matrix of a channel matrix corresponding to another sequence are not denoted by diagonal matrices. Although the odd and even elements of the resultant value $\tilde{y}_j$ obtained when the transpose matrix of the j-th element of the codebook ($\chi_H$) is multiplied by the Rx signal are decoded in different ways, if no noise occurs, a desired Tx symbol vector and the effective channel matrix corresponding to the used sequence can always be searched for. Therefore, $\tilde{y}_j$ is divided into $\tilde{y}_j^{Even}, \tilde{y}_j^{Odd}$ as shown in the following equation 32, and $\tilde{y}_j^{Even}, \tilde{y}_j^{Odd}$ may be decoded in different ways.

$$\tilde{y}_j^{Even} = \begin{bmatrix} \tilde{y}_{j,2} \\ \vdots \\ \tilde{y}_{j,8} \end{bmatrix}, \tilde{y}_j^{Odd} = \begin{bmatrix} \tilde{y}_{j,1} \\ \vdots \\ \tilde{y}_{j,7} \end{bmatrix}, \text{where, } j \in \{1, 2, 3, 4\} \quad \text{[Equation 32]}$$

As can be seen from Equations 25 to 27, $d_{Even}^{[k,j]}$ and $d_{Odd}^{[k,j]}$ may be searched for, and the Tx symbol vector and the Tx antenna index sequence may be determined using the following equation 33.

$$(k^*, j^*) = \arg\min_{\forall k, \forall j}(d_{Even}^{[k,j]} + d_{Odd}^{[k,j]}) \quad \text{[Equation 33]}$$

A detailed description of the receiver having lower calculation complexity than the receiver of FIG. 6 will hereinafter be given.

Figure 7:
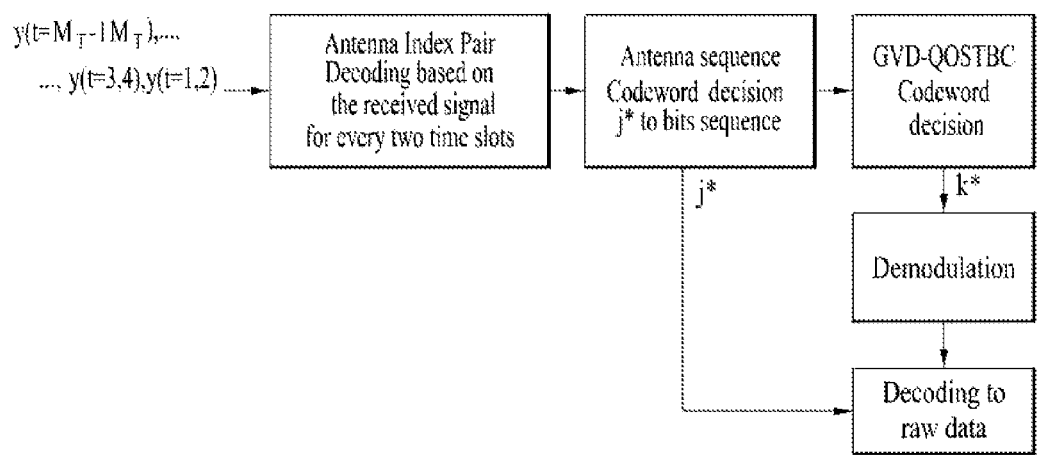
FIG. 7 is a block diagram illustrating a receiver according to another embodiment of the present invention.

FIG. 7 is a block diagram illustrating a receiver according to another embodiment of the present invention.

The receiver shown in FIG. 6 simultaneously searches for all QO-STBC symbols and all antenna index sequences. If many antennas are present and the modulation order is very high, the complexity may excessively increase. As a result, the low complexity Rx scheme for sequentially searching for antenna indexes two by two may be considered and used.

As can be seen from Equation 25, Equation 26, and Equation 31, although the effective channel matrix ($\mathring{\mathbf{H}}_j$) is not denoted by the block diagonal matrix, $\mathring{\mathbf{H}}_j^H \mathring{\mathbf{H}}_j$ may be diagonal matrices. Accordingly, one antenna index pair may be decided on the basis of two timeslots. In FIG. 7, the Rx symbol vector may be represented by the following equation 34 according to the symbol reception (Rx) time.

$$t=(1,2),(3,4),\ldots,(M_T-1,M_T), y(1,2), y(3,4),\ldots, y(M_T-1,M_T)$$

First, the codebook $\chi_{G-STBC}$ may be used to search for the pair of antenna indexes. The QAM symbol defined in the codebook $\chi_{QAM,QOSTBC}$ of Equation 13 may be decoded as long as $M_T/2$ GBD-QOSTBC symbols, and the inverse matrix of the matrix (TD) of Equation 14 is multiplied by the decoded result, such that it may be search for the QAM symbol using the multiplication result. Therefore, after the antenna index sequence is determined on the basis of $\chi_{G-STBC}$ according to the Rx scheme of the present invention, it may be search for $\chi_{QAM,QOSTBC}$. For convenience of description, four antenna index sequences of Equation 35 may be considered and used.

$$t = (1, 2), (3, 4), \ldots, (M_T - 1, M_T) \quad \text{[Equation 35]}$$
$$I_1(00) = (1, 2), (3, 4), (5, 6), (7, 8)$$
$$I_2(01) = (1, 3), (2, 4), (5, 7), (6, 8)$$
$$I_3(10) = (1, 4), (2, 5), (3, 8), (6, 7)$$
$$I_4(11) = (1, 5), (2, 6), (3, 7), (4, 8)$$

The antenna index pairs capable of being used at the condition (t=1,2) may be limited to (1,2), (1,3), (1,4), (1,5). Therefore, only four combinations may be considered and used at t=1,2. The same results may be acquired not only at t=3,4 but also at the subsequent timeslots located after t=3,4. Assuming that the k-th symbol vector of $\chi_{G-STBC}$ is transmitted at t=1,2 and the antenna indexes (1,3) are then selected, two GBD-QOSTBC symbols may be $(h_1h^*_1+h_3h^*_3)(S_1[k],S_2[k])$, respectively. If there is no influence of interference, the GBD-QOSTBC symbol can always be searched for.

As can be seen from Equation 14, since only $S_1[k]$ and $S_2[k]$ can be transmitted at t=1,2, $S_j[k], j \geq 3$ is not considered at t=1,2. The same principle as in the above case may be used even at t=3,4, so that only $S_j[k], j=3,4$ of the codebook ($\chi_{G-STBC}$) may be used in the above searching process. As a result, although the GBD-QOSTBC symbol and the antenna index are simultaneously searched for, this searching process is performed on the basis of 2 Alamouti blocks, instead of using the method for searching for all sequences, such that the above-mentioned method may have lower calculation complexity than the joint-ML scheme.

In summary, the legacy GBD-QOSTBC structure is modified in a manner that the sequence composed of the Tx antenna indexes may be constructed and the binary data sequence may be allocated to the resultant antenna sequence, such that some parts of data to be loaded on the Tx symbols (i.e., QAM and PSK modulation symbols) and then transmitted can be allocated to the antenna sequence. Accordingly, reduction of a minimum length between symbols can be prevented when the modulation order increases, so that an improved BER performance superior to that of the GBD-QOSTBC scheme can be provided to the SNR region of a predetermined level or higher.

Whereas the legacy STBC-SM scheme must unavoidably accept the diversity performance deterioration instead of obtaining the SM gain when the data stream is transmitted, the proposed scheme of the present invention loads data on the Tx antenna sequence and then transmits the resultant Tx antenna sequence, without loss of a maximum amount of the diversity gain that is capable of being obtained by the QO-STBC scheme, such that a gain similar to that of the SM-MIMO scheme can be obtained.

As is apparent from the above description, the embodiments of the present invention can more effectively transmit data in a MIMO wireless communication system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a signal to a receiver by a transmitter in a multiple input multiple output (MIMO) wireless communication system, comprising:
generating a bit stream having a size of specific bits through channel coding of data;
dividing the bit stream into a first bit stream having a first bit size and a second bit stream having a second bit size;
allocating the second bit stream having the second bit size to an antenna sequence codeword selected from a plurality of antenna sequence codewords based on a signal transmission time, wherein the antenna sequence codeword comprises indexes of a plurality pair of antenna ports not overlapped with each other and indexes of each pair of antenna ports indicates one bit of the second bit stream; and
transmitting the first bit stream having the first bit size to the receiver using the plurality of pair of antenna ports according to an order of antenna pairs indicated by the allocated antenna sequence codeword.

2. The method according to claim 1, wherein the antenna sequence codeword is defined by 2 timeslots and 2 antenna indexes.

3. The method according to claim 1, wherein the transmitting the first bit stream having the first bit size includes:
transmitting the first bit stream having the first bit size using QO (quasi-orthogonal)-STBC (space time block code), according to the order of antenna pairs indicated by the allocated antenna sequence codeword, on a timeslot basis.

4. The method according to claim 3, wherein the allocated antenna sequence codeword indicates a pair of antennas needed to transmit data during 2 timeslots.

5. The method according to claim 1, wherein the sum of the first bit size and the second bit size is identical to the specific bit size.

* * * * *